United States Patent [19]

Markus Lenk et al.

[11] 4,419,676
[45] Dec. 6, 1983

[54] METHOD OF RECORDING SIGNALS ON BANDS BY MEANS OF LASER BEAMS AND APPARATUS FOR CARRYING OUT THE METHOD

[75] Inventors: Attila Markus Lenk; András Podmaniczky; Szabolcs Tőkés, all of Budapest, Hungary

[73] Assignee: Magyar Tudományos Akadémia Számitástechnikai és Automatizálási Kutató Intézete, Budapest, Hungary

[21] Appl. No.: 293,202

[22] PCT Filed: Dec. 11, 1980

[86] PCT No.: PCT/HU80/00009
§ 371 Date: Aug. 11, 1981
§ 102(e) Date: Aug. 11, 1981

[87] PCT Pub. No.: WO81/01767
PCT Pub. Date: Jun. 25, 1981

[30] Foreign Application Priority Data

Dec. 18, 1979 [HU] Hungary .................................. 3252

[51] Int. Cl.³ ............................................. G01D 9/42
[52] U.S. Cl. ......................................... 346/108; 354/5
[58] Field of Search ...................... 346/76 L, 109, 108; 354/5

[56] References Cited

U.S. PATENT DOCUMENTS 3,713,721  1/1973  Watson ........................... 346/108 X
4,019,186  4/1977  Dressen et al. ...................... 346/108
4,253,102  2/1981  Kataoha et al. ................. 346/76 L X

OTHER PUBLICATIONS

Watson, Hugh A., *Bell Laboratories Record* "An Experimental Page Facsimile System", Mar., 1975, pp. 163-167.

*Primary Examiner*—Todd E. De Boer
*Attorney, Agent, or Firm*—Karl F. Ross; Herbert Dubno

[57] ABSTRACT

A method for recording character or marking signals by multi-beam laser technique, in which the characters are recorded in multi-rastered bands in such a way that the character information is inverted, whereby the recording surface is illuminated by the laser beams at each location that do not comprise characters or marks. In character locations the surface is not illuminated. The gaps between adjacent bands are illuminated by separate band gap illuminating laser beams. By using this method the electrophotographic image recording can be solved by means of conventional inexpensive positive copiers in which image reversal does not take place. The apparatus for carrying out the method comprises a Bragg cell, a control unit for producing several raster scanning laser beams, and oscillators for generating additional band gap illuminating laser beams. An inverting unit is inserted in the path between the information source and the control unit to perform electronic image reversal.

12 Claims, 7 Drawing Figures

METHOD OF RECORDING SIGNALS ON BANDS BY MEANS OF LASER BEAMS AND APPARATUS FOR CARRYING OUT THE METHOD

CROSS REFERENCE TO RELATED APPLICATIONS

This application is a national phase application of Patent Cooperation Treaty application PCT/HU 80/00009 filed Dec. 11, 1980 and based upon Hungarian application MA 3252 filed Dec. 18, 1979 under the International Convention.

FIELD OF THE INVENTION

The invention relates to a method for recording signals on bands so that signal information transmitted in digital form from a source can be recorded in a suitable recording surface in each band comprises a plurality of character raster lines. The main field of application of the invention includes electronically controlled character printers, text writing copiers and electronic film producing techniques. The invention relates also to an apparatus for carrying out the method.

BACKGROUND OF THE INVENTION

In the DE OS No. 2 755 575 a laser-operated signal recording apparatus is described that comprises an acousto-optical cell utilizing Bragg diffraction for generating a plurality of simultaneously outgoing diffracted laser beams. The outgoing laser beams are projected on a signal recording surface by means of a suitable optical system and the beams are also deflected to scan a bandlike raster on the signal recording surface. The acousto-optical cell is controlled in accordance with the information defined by the shape of the characters to be recorded, and the scanning beams illuminate the recording surface in locations that correspond to the presence of the characters. The areas that do not comprise characters are not illuminated at all.

This known apparatus provides for rapid information recording, and because of to the application of a multi-beam raster the speed of its electronic circuitry does not have to be above normal values.

There are a large number of conventional multi-beam information recording devices including the above cited system that have a common drawback, namely, that the recording surface is illuminated at locations corresponding to the positions of the characters to be recorded. Usually in the recorded documents the character locations should have a definite shade that distinguishes them from the generally white shade of the carrier (paper). For ensuring such properties in conventional laser operated recording equipment of the above type, an electrophotographic image reversal is used, by means of which the recorded document comprises positive (black) surfaces at the illuminated locations.

The moodes used for electrophotographic image reversal are substantially complex and expensive compared to the widely used document copying equipments intended for use in offices. In such equipments positive copies are produced without electrophotographic image reversal, and the copy is black at locations in which the original document is black.

In order to eliminate the latter type of image reversal in laser operated recording equipment the image reversal may be carried out by optoelectronic means by the appropriate control of the laser beam used for recording the characters.

In the periodical "Electronics" (No. 5 1979, pp 46 to 48) an apparatus is described, in which a single laser beam scans a raster on the recording surface, and the control of the laser beam occurs in accordance with optoelectronic image reversal. This way in that apparatus there is no need for electrophotographic image reversal, and positive copier units can be used for the image recording.

The application of a single laser beam that scans each raster line of the character separately necessitates a remarkable increase in the scanning frequency compared to multi-beam recording technique, if the time of the recording remains unchanged. The required fast deflection of the laser beam cannot be effected by means of the widely used swinging mirror technique. Such fast scanning can be realized by an expensive rotating mirror or by means of an additional acousto-optical cell. Due to the higher speed used in the single beam technique, the speed of controlling the acousto-optical cell must also be increased in a corresponding manner. This means that high speed electronic circuits must be used, which substantially contributes to the production costs. To ensure an undistorted image reconstruction from the raster image a precise synchronism should be provided between the movement of the scanning beam and the displacement of the recording medium. Additionally, a synchronism between subsequent raster lines should be provided with an accuracy in the order of a few nanoseconds.

Because of these technical difficulties connected with this approach the advantages deriving from the elimination of electrophotographic image reversal are at least in great part be compensated by the problems connected with the optoelectronic image reversal when a single raster beam is used.

OBJECT OF THE INVENTION

The object of the invention is to provide a method of and an apparatus for laser operated signal recording, that eliminates the need for electrophotographic image reversal and provides for character recording in discrete bands by the application of a multi-beam technique.

SUMMARY OF THE INVENTION

According to the invention the above object is solved by a method, in which a plurality of laser beams propagating in a common plane are projected onto a recording surface and the projected beams are deflected to scan discrete bands, wherein the character recording laser beams define a plurality of raster lines in which characters or marks are imaged and in each recording location of the band the generation of all character recording laser beams associated with this band is achieved simultaneously in accordance with the shape of the character or mark in the same location. The improvement according to the invention lies in that the character recording laser beams are used to illuminate locations of the recording surface that do not comprise any character or mark, and the laser beams are extinguished in the locations of the characters or marks, and in addition to the generation of the character recording laser beams at least one band gap illuminating laser beam is generated that propagates together with and in the plane of the character recording laser beams to illuminate the band gaps of the recording surface.

In the method according to the invention the multibeam character recording technique provides optoelectronic image reversal by means of ensuring the correct illumination of the band gaps in addition to the inverting of the character signals, whereby the complete recording surface is illuminated except for the positions of the characters.

In the apparatus for carrying out the method the control unit of the beam generating acousto-optical cell comprises oscillators of constant frequency associated with the generation of character recording laser beams, and gating circuits for coupling the oscillators to the acousto-optical cell, and an inverter connected between the gating input of the gating circuit and an information receiving unit to perform an electronic image reversal, whereby the gating circuit inhibits the passage of the oscillator output therethrough in the moments of existing character contents, while enables said passage in any other moment, and the control unit comprises at least one additional oscillator for generating band-gap illuminating laser beams to illuminate band gaps between the bands of characters.

SPECIFIC DESCRIPTION

Figure 1:
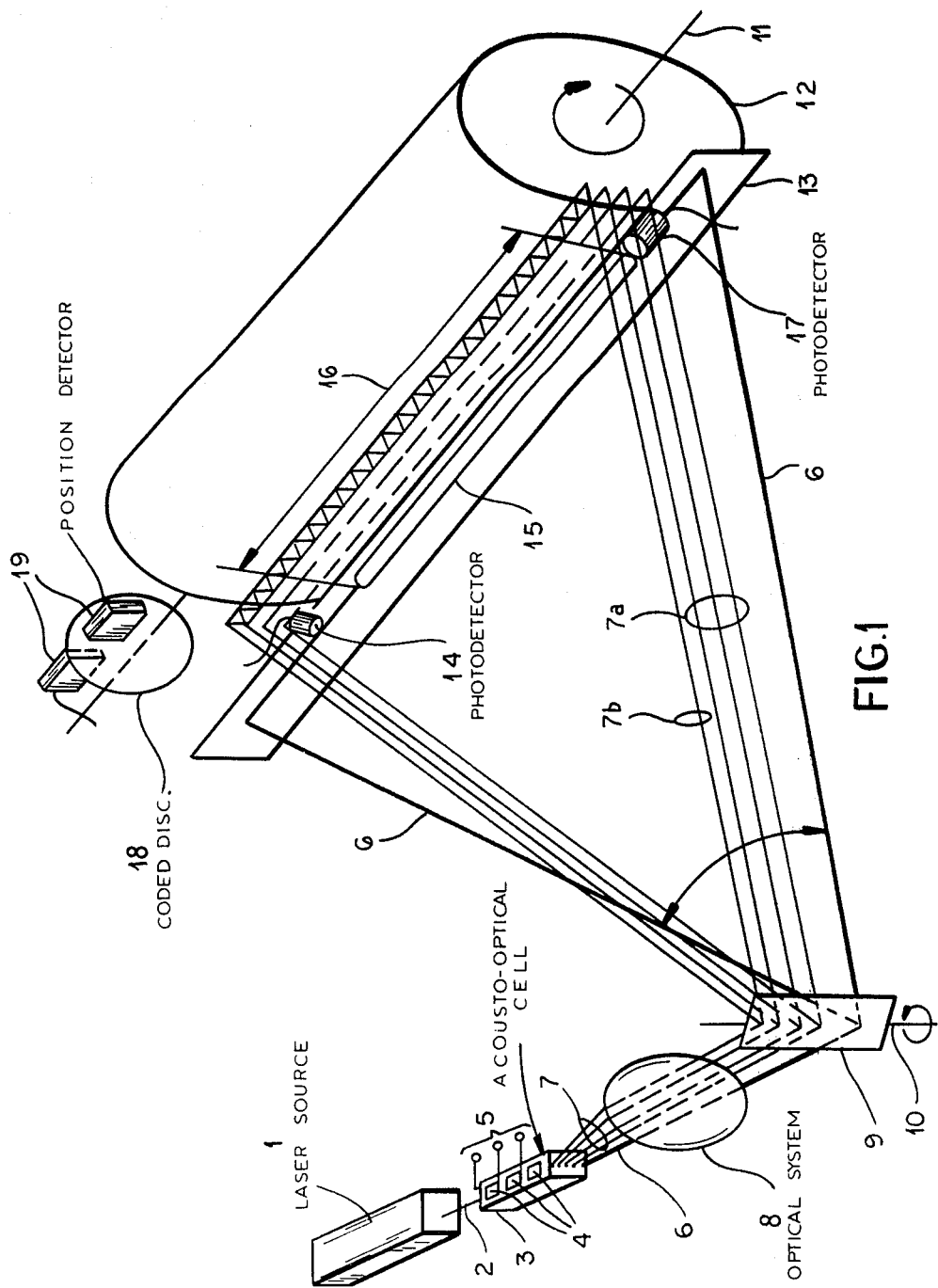
FIG. 1 is a diagrammatic perspective view of an optical arrangement used for the method according to the invention.

FIG. 1 shows the arrangement of the optical units of the apparatus according to the invention and this arrangement is similar to FIG. 1 of the DE OS No. 2 755 575. The arrangement comprises a laser source 1 and an acousto-optical cell 3 receiving the outgoing laser beam 2 of the laser source. A number of ultrasonic transducers 4 are arranged one behind another other on a surface of the acousto-optical cell 3 and each of them comprises a terminal 5. In the acousto-optical cell 3 Bragg diffraction is utilized, and in response to appropriate control signals the cell 3 generates an undeflected laser beam 6 and a plurality of diffracted laser beams 7. The outgoing laser beams 6 and 7 propagate in a common plane. The design of the acousto-optical cell 3 can be identical with the cell described in the DE OS No. 2 755 575 referred to above (see also U.S. Pat. No. 4,371,964 issued Feb. 1, 1983). The specific way of control of the cell 3 will be described later in connection with FIGS. 2 and 6.

In the path of the undeflected and diffracted laser beams 6 and 7 an optical system 8 (preferably a lens) and a swinging mirror 9 are arranged. The swinging mirror 9 is rotated periodically around a rotational axis 10 to perform a swinging movement, whereby the direction of the laser beams 6 and 7 projected through the optical system 8 varies periodically. In FIG. 1 the two extreme positions of the undeflected laser beam 6 have been illustrated by heavy lines. The so deflected laser beams 7 scan discrete bands defined on a recording surface. In the exemplary embodiment shown in FIG. 1 the recording surface is a mantle surface of an electrophotographic copying drum 12 which rotates with constant speed around its axis 11. In each swinging period of the swinging mirror 9 the laser beams scan successive bands on the recording surface. It should be noted that the swinging mirror 9 can be replaced by any appropriate means which is capable of deflecting the laser beams in the required manner.

In response to the scanning movement of the laser beams 7 and the rotation of the drum 12, raster bands are formed on the surface of the drum 12.

The raster bands illustrated in FIG. 1 extend horizontally in line directions. The laser beams 7 can be grouped into laser beams 7a for scanning character lines in which characters can be recorded and in laser beams 7b used for illuminating the band gaps defined between the discrete character bands. The recording surface does not need to be cylindrical and can have any appropriate shape e.g. it can well be a planar surface. In the latter case the rotation of the cylinder should be replaced by a suitable linear movement.

In the embodiment shown in FIG. 1 the undeflected laser beam 6 impinges upon a knife edge 13 arranged in front of the copying drum 12. The upper contour line of the knife edge 13 falls below the horizontal raster band scanned by the diffracted laser beams 7. There are arranged in front of the copying drum 12 a first photodetector 14, a light guiding rod 15 and a second photodetector 17. The photodetector 14 is adapted to sense the extreme positions of the laser beam 6 and to generate a signal to a control unit (not shown in FIG. 1) when the laser beams commence scanning a horizontal character band but they still do not reach the useful recording surface. The length of the light guiding rod 15 equals the width of the useful recording surface i.e. the length 16 of the character bands. The light guiding rod 15 is made preferably of an optically transparent material, and in response to the laser beam 6 falling on any point of its surface it delivers a light pulse to the photodetector 17 by utilizing a multiplicity of internal light reflections. The so illuminated active condition of the photodetector 17 means that the deflected laser beams fall within the useful recording range.

The rotational speed of the copying drum 12 should be adjusted in accordance with the movement of the swinging mirror 9. For the purpose of adjusting and holding the appropriate rotational speed, a coded disc 18 is mounted at one end to the copying drum 12 and an angular position detector 19 is used for sensing the speed of the coded disc 18.

Figure 2:
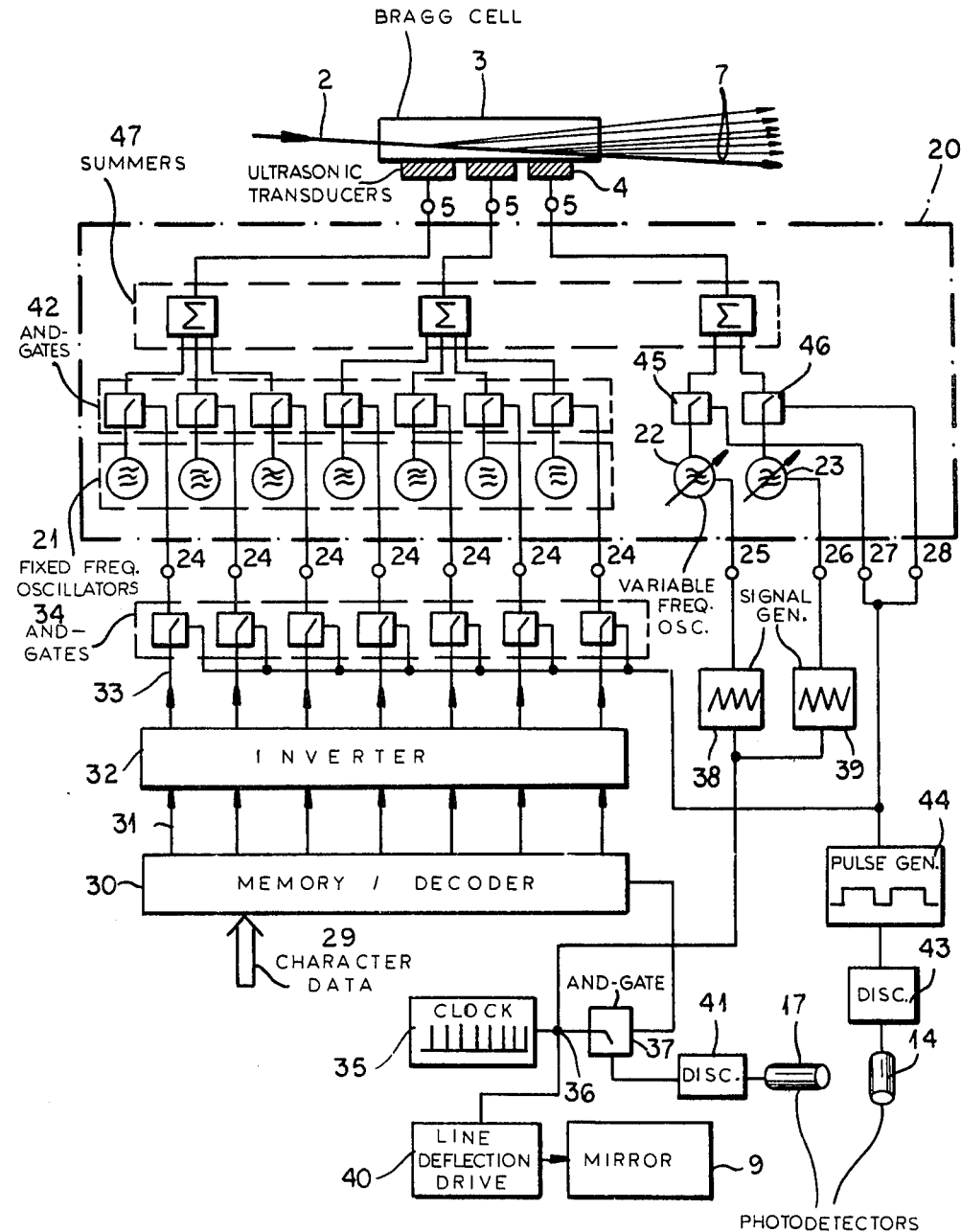
FIG. 2 is a block diagram of the first embodiment of the apparatus according to the invention.

Referring now to FIG. 2 in which the unit used for controlling the apparatus according to the invention is illustrated, the terminals 5 of the ultrasonic transducers 4 of the acousto-optical cell 3 are driven by a control unit 20. The structural design of the control unit 20 is substantially identical with the control unit described in our copending European application having the publication number 00 181 50 (see U.S. Pat. No. 4,571,964) used for controlling a similar acousto-optical cell. The control unit 20 comprises linear summing networks 47; the number of these networks corresponds to the number of the terminals 5. The first inputs of the first two linear summing networks 47 are coupled through respective AND gates 42 to outputs of the VHF or UHF oscillators 21 having fixed frequencies. The frequencies of the oscillators 21 are chosen in such a way that each frequency defines the diffraction angle of a corresponding laser beam 7a when leaving the acousto-optical cell 3. The amplitudes of the oscillators 21 determine the intensities of the associated laser beams. In FIG. 2 seven oscillators 21 have been illustrated that can be used for a seven-line or seven-column character recording. Of course, the number of the oscillators can be greater than seven, and in that case the resolution of the recording will be better.

The third linear summing network 47 comprises a pair of inputs which are coupled through respective AND gates 45 and 46 to outputs of oscillators 22 and 23 with variable frequency. The oscillators 22 and 23 comprise respective frequency determining control inputs 25 and 26. Later it will be explained that the frequency bands of the oscillators 22 and 23 do not comprise the discrete frequencies of the oscillators 21, and these bands are adjusted in such a way that the associated laser beams 7b should illuminate the line gaps or column gaps defined between the character bands.

The second inputs of the AND gates form control inputs 24 for the control unit 20. Similarly, the second inputs of the AND gates 45 and 46 form control inputs 27 and 28 for the control unit 20.

The operation of the apparatus is controlled by the pulses of a raster clock 35. The raster clock 35 generates respective raster pulses which, in the case of scanning in line direction, define the duration of elementary raster columns of the characters, and in the case of scanning in column direction define the duration of elementary raster lines of the characters. The swinging frequency of the swinging mirror 9 shown in FIG. 1 is defined through a drive for line deflection 40 also by means of the raster clock 35. The drive 40 provides for a correspondence between a complete deflection period of the swinging mirror 9 and the full time of the raster pulses occurring during this deflection.

The photodetector 17 shown in FIG. 1 that delivers pulses during the useful recording range is coupled through a discriminator 41 to an AND gate 37. The AND gate 37 comprises a second input coupled to the output of the raster clock 35. As a result of this connection the output of the AND gate 37 comprises the raster pulses during the useful recording range only. The output of the AND gate 37 is coupled to the enable input of a memory and decoder unit 30 which receives through its information inputs 29 the information defining the character or mark to be recorded. The memory and decoder unit 30 has respective outputs 31 in which during each raster pulse the simultaneously existing picture information of the respective characrer recording laser beams will be present. Under the term "simultaneously existing" it is understood that the respective outputs 31 provide digital signals during each raster pulse and said signals carry the information of points located vertically under each other in a character band in the moment of the raster pulse, when the scanning is horizontal, and said signals carry the information of horizontal points of a character column when the scanning is vertical.

The outputs 31 are coupled to an inverter unit 32, in which respective interters are arranged for each of the outputs 31. The inverter unit 32 comprises outputs 33 providing the inverted values of the digits present at the outputs 31. This means that in the points of the image to be recorded that do not carry any picture information, the logical value ofthe associated output 33 will be "1", and in the points that carry picture information, the logical value will be "0".

The outputs 33 are coupled to the first inputs of AND gates 34. The second inputs of the AND gates 34 are interconnected and coupled to the output of a pulse generator 44 which is activated during the complete line duration (column duration). The outputs of the AND gates 34 are coupled to the control inputs 24 of the control unit 20 to define those time periods, in which the outputs of the oscillators 21 can pass to the acousto-optical cell 3.

The pulse generator 44 generates the pulse of the complete line duration (or column duration) from the output signal of the photodetector 14 by means of a discriminator 43. Additionally, the output of the pulse generator 44 controls through the control inputs 27 and 28 the open condition of the AND gates 45 and 46.

The output of the raster clock 35 is coupled to control inputs of triangle or sawtooth signal generators 38 and 39. The triangle signal generators 38 and 39 control the frequency determining control inputs 25 and 26 of the variable frequency oscillators 22 and 23 by a frequency signal which is equal to or higher than the frequency of the raster pulses. In response to such control the output frequency of the oscillators 22 and 23 varies between lower and upper limit frequency values in accordance with the triangular or sawtooth control signal.

The operation of the apparatus according to the invention and the examples for carrying out the method will be described in connection with FIGS. 4 and 5, in which reference will be made to the time curves of FIG. 3.

Figure 4:
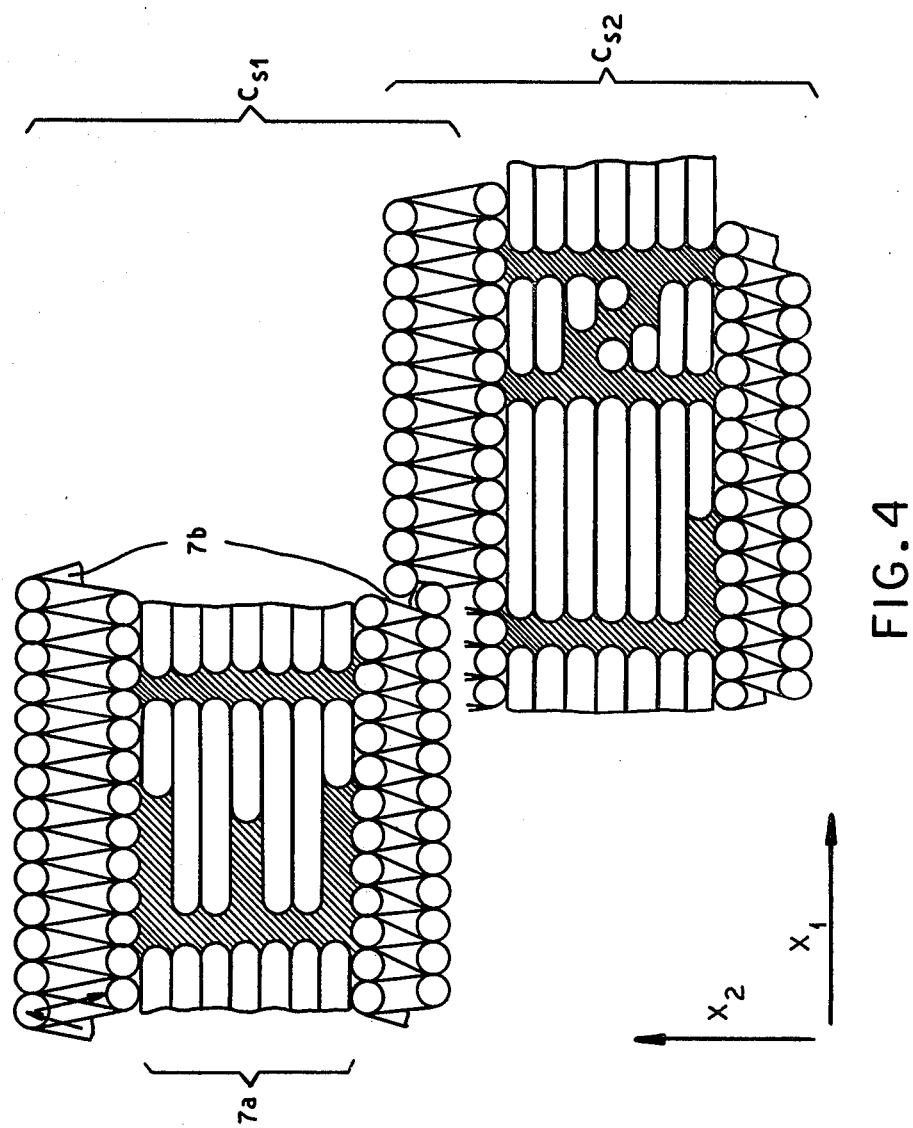
FIG. 4 is an enlarged detial view of two tracks recorded by the apparatus shown in FIG. 2 with a scanning occurring in line direction.

FIG. 4 shows an enlarged detail of an image recorded by means of the arrangement shown in FIG. 1, namely respective parts of a pair of neighboring character bands $C_{S1}$ and $C_{S2}$.

Figure 3:
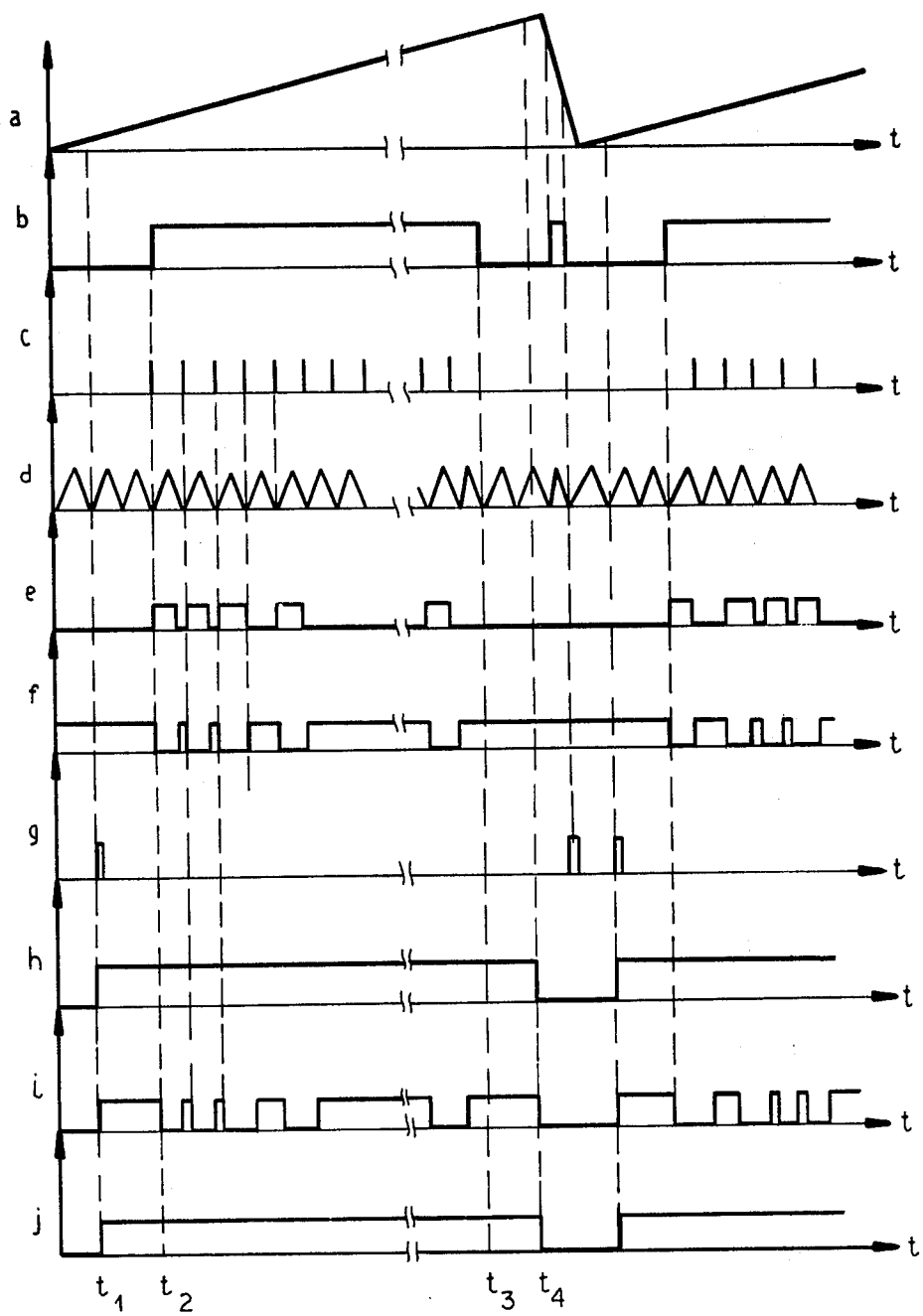
FIG. 3 is a graph which shows the voltage curves at characteristic points of the circuit of FIG. 2.

The seven character recording laser beams 7a and the two band gap illuminating laser beams 7b generated by the acousto-optical cell 3 take a position in the moment $t_1$, in which the undeflected laser beams 6 illuminates the photodetector 14, and the pulses of the photodetector 14 are shown in FIG. 3, diagram g. The operation of the control unit shown in FIG. 2 is enabled by a line duration signal derived from the pulse of the photodetector 14, and the line duration signal (FIG. 3 diagram h) is provided in the output of the pulse generator 44 and it enables the open condition of the AND gates 34 and of the AND gates 45, 46.

Now, the generation of the band gap illuminating laser beam 7b will be described. After the moment $t_1$ the outputs of the variable frequency oscillators 22 and 23 are coupled to a segment of the acousto-optical cell 3 and provide diffracted laser beams 7b according to their actual frequencies. In the example shown in FIG. 4 two laser beams 7b have been provided, and the first of these beams falls on the recording surface just above the band of the character recording laser became 7a, while the other beam 7b falls just below this band. The upper band gap illuminating laser beam should illuminate a band gap which has a height of four raster lines. If this illumination is provided by a single laser beam 7b, the intensity of this laser beam should be four times higher than the intensity any of the character recording laser beams 7a. By periodically changing the frequency of the oscillator 22 in accordance with the triangular control signal (shown in diagram d. in FIG. 3), the laser beam 7b associated with the upper band gap will be diffracted vertically to perform an alternating up-down movement in a band gap having a height of four raster lines, and the deflection provided by the movement of the swinging mirror 9 in the horizontal direction results in that the laser beam 7b will completely illuminate the upper band gap. The focal diameter of the laser beam 7b corresponds preferably to the size of a raster line, which has been indicated in FIG. 4 by respective circles. If the frequency of the triangular signal is at least equal to the frequency of the raster pulses, then the condition required for the complete illumination of the band gap is satisfied. In a similar way the lower one of the laser beams 7b illuminates a part of the lower band gap. In the exemplary case the height of the lower illuminated gap corresponds to that of three raster lines, and the frequency of the associated oscillator 23 is changed within a correspondingly narrower band. It is also sufficient for the appropriate gap illumination if the lower laser beam 7b has three times as high intensity as the character recording laser beam 7a has.

It can be seen from the two adjacent character bands shown in FIG. 4 that an overlapping range with a height of two raster lines have been provided between the illuminated neighboring band gaps, i.e. the upper two hypothetical band gap raster lines of the lower band coincides with the two lower hypothetical band gap raster lines of the upper band. The so obtained overlapping between the band gaps is advantageous because the fluctuations of the speed of rotation of the copying drum 12 can not cause recording errors and the need for an expensive and precise synchronism between the speed of the drum 12 and the control of the swinging movement of the mirror 9 will this way be eliminated.

It should be noted that the application of laser beams 7b deflected in accordance with a triangular control signal is preferable, however, the illumination of the band gaps can also be provided by the application of undeflected laser beams generated by constant frequency oscillators if such beams scan each of the raster lines falling in the band gaps.

The recording of the characters can be started after the moment $t_2$, whereafter the laser beams fall in the useful recording range. The useful recording period is shown in diagram b. of FIG. 3. During this period the photodetector 17 is continuously illuminated by the light guiding rod 15. Diagram c. in FIG. 3 shows the gated raster pulses present at the output of the AND gate 37. Each raster pulse provides for the reading of the seven information bits associated with the seven raster lines of the character to be recorded, whereby the corresponding information will occur in the respective outputs 31. In the exemplary case the character to be recorded consists of seven raster lines and each of these lines is associated with a respective one of the oscillators 21 used for generating the laser beam illuminating the particular raster line. When e.g. the letter "I" shown in FIG. 4 is recorded, each of the seven outputs 31 comprises logical "1" level, while each of the inverted outputs 33 comprises logical "0" level.

During the useful recording period of the AND gates 34 receive enable signals (a in FIG. 3) from the pulse generator 44 through their second inputs, whereby the condition of the AND gates 42 will be determined only by the conditions of the respective inverted output 33. Diagram e. in FIG. 3 shows the logical state of one of the outputs 31 throughout several raster periods, while diagram f. shows the condition of the associated inverted outputs 33. Due to the inversion the output 33 comprises a logical "1" level when the associated laser beam has already scanned the useful recording section between the moments $t_2$ and $t_3$. This can be seen in diagram i. of FIG. 3 illustrating the condition of the output of the associated AND gate 42.

As a result of the above described recording technique the positive image of the character to be recorded will be imaged on the recording surface, i.e. the surface will not be illuminated in positions in which a character exists, and all other areas of the surface will be illuminated. This positive illumination is preferable because in that case any conventional positive recording technique can be used.

In order to exclude any recording during the return movement of the swinging mirror 9, the output of the pulse generator 44 is used for switching off all laser beams between the moment $t_4$ and the starting moment $t_1$ of the next period by means of inhibiting the passage of signals through the AND gates 34, 45 and 46.

Figure 5:
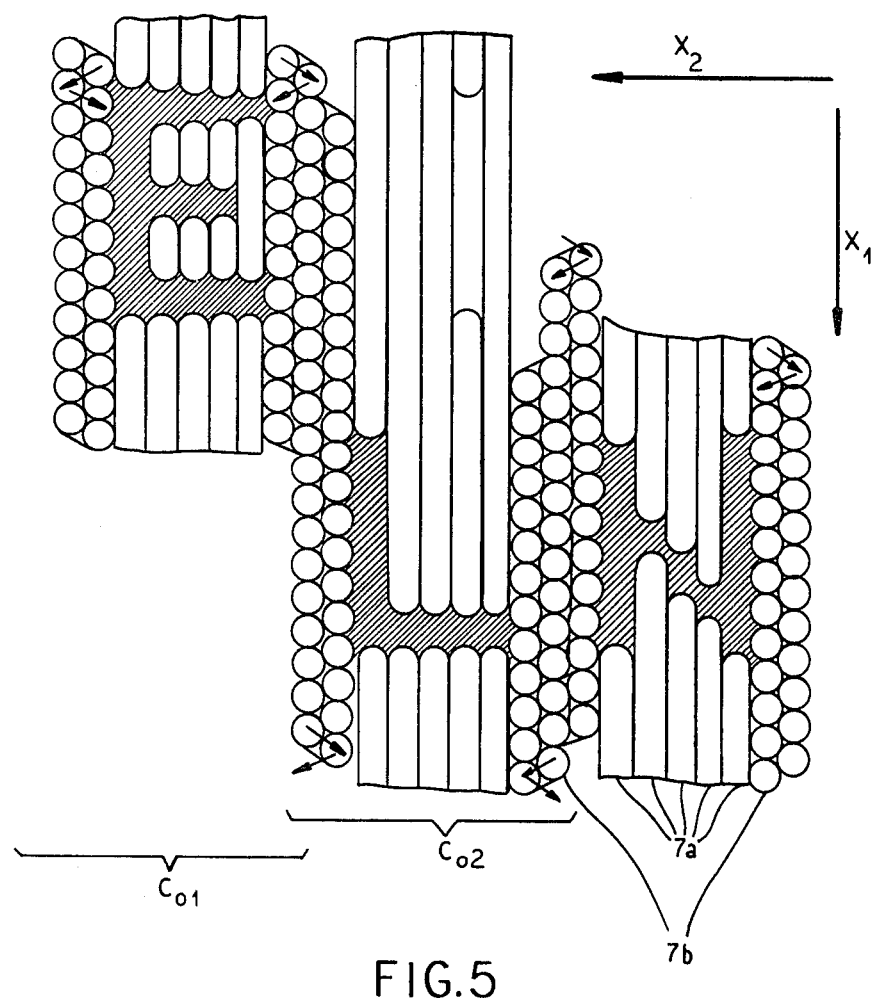
FIG. 5 is an enlarged view similar to FIG. 4 for scanning in column direction.

FIG. 5 corresponds substantially to FIG. 4, however, the recording occurs here in a normal direction (turned by 90°) relative to the recording in FIG. 4 i.e. in the recorded document the directions $X_1$ and $X_2$ will be mutually interchanged. The character bands in FIG. 4 will be character colums in FIG. 5, while the band gaps will be column gaps. The recording technique remains substantially unchanged, however, the memory and decoder unit 30 should comprise now the horizontal information of the characters in common addresses. FIG. 5 shows three column bands extending beside each other, in which each column band comprises five raster columns, a left column gap having a width corresponding to that of two raster columns and a right column gap with an identical width. The overlapping between neighboring column gaps takes the width of two raster columns.

If the number of the character recording laser beams 7a remains unchanged when vertical scanning is used, the resolution of the characters will be finer because the height of the characters is greater than their width, and the number of the recording laser beams cannot influence the vertical resolution during vertical scanning.

Figure 6:
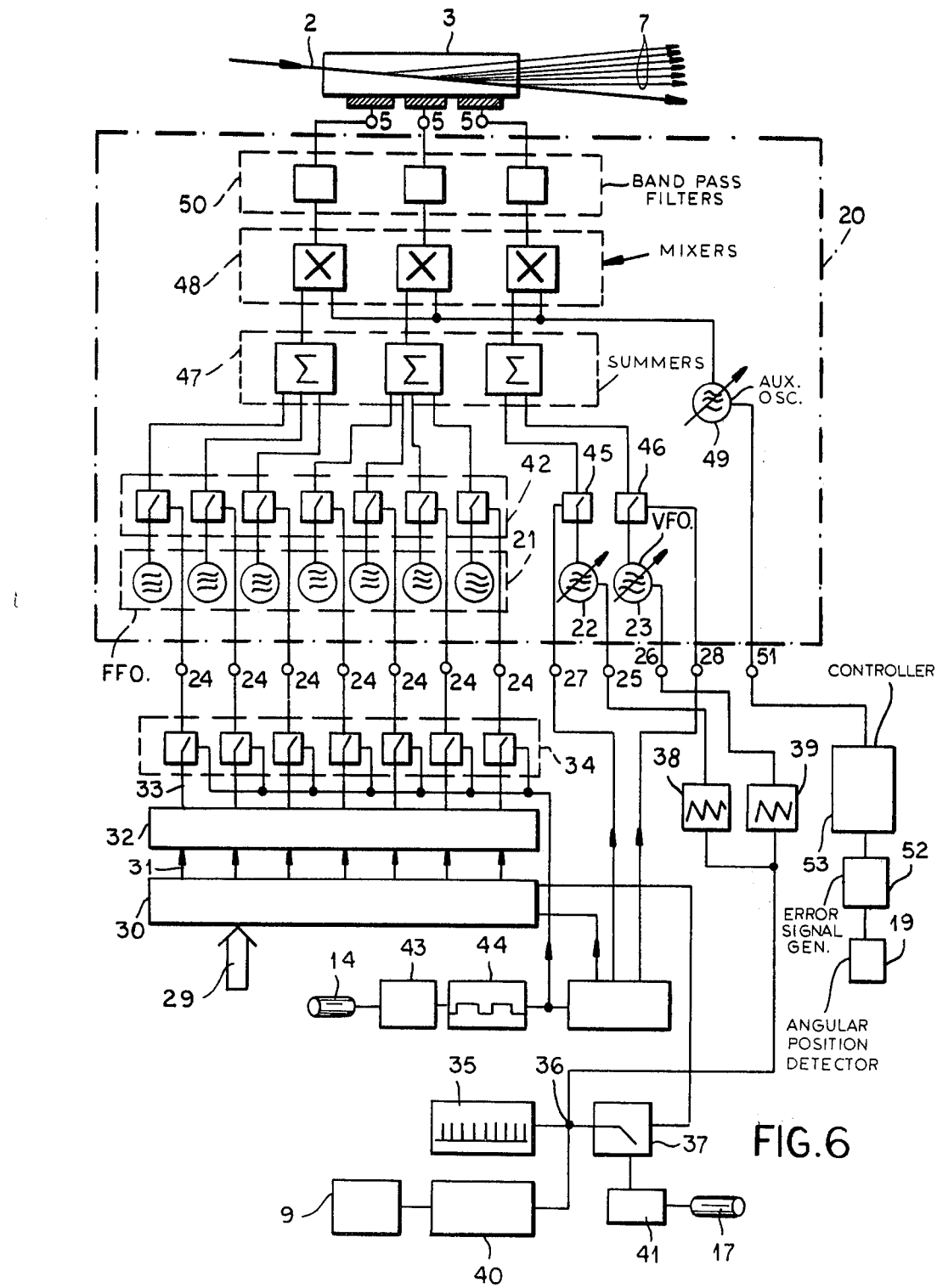
FIG. 6 is a block diagram of a second embodiment of the invention that enables the matching of the lines in a direction normal to the deflection plane.

FIG. 6 shows a further embodiment of the apparatus according to the invention by which all of the outgoing laser beams can be deflected simultaneously in their common plane, whereby the exact position adjustment of the bands can be carried out normal to the scanning direction. The control unit 20 of FIG. 6 is similar to the corresponding unit described in our copending European application having the publication number 00 181 50, that can be used for the simultaneous deflection of all outgoing laser beams (see U.S. Pat. No. 4,371,964). The control unit 20 of FIG. 6 differs from the control unit of FIG. 2 in that it uses an auxiliary oscillator 49 which is coupled to first inputs of mixers 48. The second inputs of the mixers 48 are connected with the outputs of the linear summing networks 47, and the outputs of the mixers 48 are coupled through respective band-pass filters 50 to the terminals 5 of the acousto-optical cell 3.

The relative frequences of the oscillators 21, 22 and 23 should be set in the same way as in the embodiment of FIG. 2, and the only difference lies in that in the present case the differences between the frequencies of the auxiliary oscillator 49 and that of the oscillators 21, 22 and 23 should be adjusted to the same VHF or UHF values that ensures the appropriate operation. The band-pass filters 50 are tuned to these VHF or UHF frequency bands. The frequency of the auxiliary oscillator 49 can be changed by a voltage signal coupled to its frequency determining control input 51, and the position of all diffracted laser beams 7 that leave the cell 3 will change accordingly.

The control input 51 is controlled by means of the angular position detector 19 (shown in FIG. 1) through an error signal forming unit 52 and a regulating unit 53. By simultaneously shifting the position of the laser beams 7, the respective recording bands can be positioned exactly side by side even if the speed of the recording surface (the speed of the drum 12) is fluctuating or slightly changing.

We can only also sense the speed of the relative movement between the laser beams and the recording surface in a direction normal to the scanning direction forming the difference between the sensed speed and a predetermined nominal speed and can simultaneously adjust the position of all laser beams in their common plane on the basis of this difference to precisely arrange neighboring bands in side-by-side positions.

Figure 7:
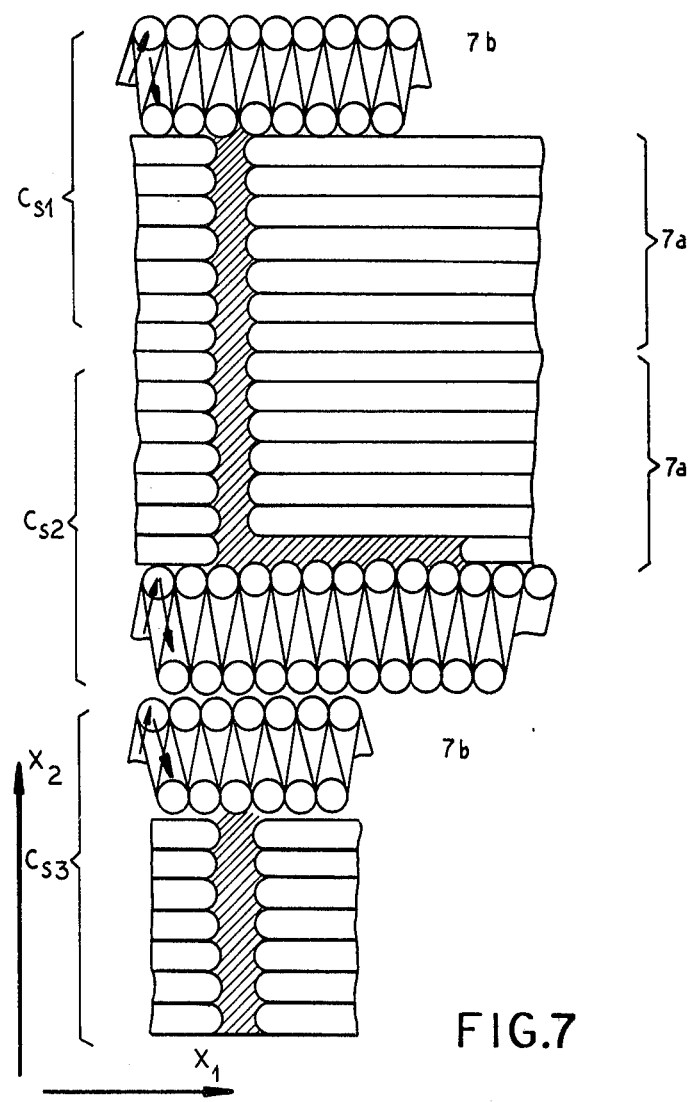
FIG. 7 is a view similar to FIG. 5 illustrating a character band plotted by two neighboring recording bands when the scanning occurs in column direction.

FIG. 7 shows the enlarged view of a part of a recording made in this way. The possibility of adjustment of the position of the laser beams in a direction normal to the scanning direction provides for attaining a finer resolution even if the number of the character recording laser beams is unchanged. In that case the recording of a complete character band takes two scanning periods of the swinging mirror 9. In the first of these periods from the two band gap illuminating laser beams 7b only the upper one is enabled and from the memory and decoder unit 30 the information of the upper seven raster lines of the character is read out. In the second period the upper band gap illuminating laser beam 7b will be blocked and the lower one enabled, and the information read out from the unit 30 will correspond to the seven laser raster lines of the same character.

By using this method the character recording will have a resolution of fourteen raster lines by means of seven oscillators and associated recording laser beams.

It can be seen from the above described examples that the essence of the present invention lies in the recording by the inverted signals of the characters and in the illumination of the full recording surface in positions other than that comprise characters. In this way the conventional inexpensive positive electrophotographic recording techniques can be used. An additional advantage is connected with the application of overlapping between the band gaps or column gaps because in that case the speed of the recording surface does not have to be kept in a precisely constant value.

The actual way of generation of the character recording laser beams, the actual type of the scanning and the type of image recording are indifferent in view of the essence of the present invention. The swinging mirror 9 can e.g. be replaced by a scanning obtained by means of an additional acousto-optical cell or a rotating mirror. Similarly, the cylindrical recording surface can be replaced by a planar surface. Also, the inverter 32 can be spared if the inverter character values are written in the memory and decoder unit 30.

In order to visualize the parameters of the recording that can be made by the present invention, the following table comprises characteristic data in case of character recordings by seven and sixteen raster lines, respectively if the recorded document is an A4 form paper (210×297 mm).

TABLE I

|  | 7 beams | 16 beams |
|---|---|---|
| beam diameter in the recording plane | 300 μm | 100 μm |
| duration of scanning periods | 14 ms | 11.6 ms |
| duration of the useful recording range | 10 ms | 8 ms |
| time period of raster pulses | 10 μs | 2.66 μs |
| frequency of the triangular signal | 150 kHz | ∅ |
| height of the upper band gap (expressed in raster lines) | 4 | 4 |
| height of the lower band gap (expressed in raster lines) | 3 | 4 |
| overlapping (expressed in raster lines) | 2 | 3 |

We claim:

1. In a method of recording signals on a band by means of laser means, comprising the steps of projecting a plurality of character recording laser beams propagating in a common plane onto a recording surface, deflecting said beams to scan respective raster lines on discrete recording bands of said surface, generating said character recording laser beams simultaneously in each recording point of each band in accordance with the shape of the character signal falling on the corresponding points. Wherein the improvement is that said recording surface is illuminated by means of said character recording laser beams only in locations that do not comprise any character, the passage of said character recording laser beams towards locations of said recording surface that comprise characters or signals is blocked, at least one band gap illuminating laser beam in addition to the recording laser beams is generated to propagate together and in a common plane therewith, and the band gaps of the recording surface are illuminated by said band gap illuminating laser beams.

2. The improvement defined in claim 1, further comprising the step of adjusting the intensity of said band gap illuminating laser beam to be higher than the intensity of any of the character recording laser beams, and deflecting said band gap illuminating laser beam normal to the scanning direction to perform an alternating movement within a predetermined band gap height with a speed substantially higher than the speed of scanning movement, whereby the band gaps will be evenly illuminated.

3. The improvement defined in claim 1, further comprising the step of defining respective band gaps at both sides of said recording bands, and illuminating said band gaps by means of at least one band gap illuminating laser beam.

4. The improvement defined in claim 1, further comprising the step of adjusting the heights of the band gaps of neighboring bands so that they overlap each other.

5. The improvement defined in claim 1, further comprising the step of recording each of said discrete bands by means of two full scanning periods of said laser beams in such a way that in a first period one of the band gaps associated with said band and a part of the character recording band are illuminated, and in the other period the second part of said character recording band and the other associated band gap are illuminated.

6. The improvement defined in claim 1, further comprising the step of sensing the speed of the relative movement between said laser beams and said recording surface in a direction normal to the scanning direction, forming the difference between the sensed speed and a predetermined nominal speed, and simultaneously adjusting the positions of all laser beams in their common plane on the basis of said difference to precisely arrange neighboring bands in side by side positions.

7. In an apparatus for recording character images on a band by a laser beam, comprising a laser source, an acousto-optical call arranged in the path of a laser beam from said source, a control unit coupled to the acousto-optical cell for generating a plurality of outgoing diffracted laser beams in the cell by means of Bragg diffraction, in which each of said laser beams lie in a common plane, an optical system for deflecting all laser beams coming out from the cell to scan a band on a recording surface, actuating means for establishing a relative movement between the laser beans and the recording surface in a direction normal to the scanning, and an information receiving means for receiving the information to be recorded and forwarding the same in the form of digital signals to said control unit, the improvement wherein said control unit comprises a predetermined number of oscillators with fixed frequency for generating character recording laser beams, gate circuits for coupling the outputs of said oscillators to the acousto-optical cell inverter means coupled between the outputs of said information receiving means and the gating inputs of said gate circuits in moments when characters or signals exist and to enable said signal passage in any other moment, and at least one additional oscillator for generating band gap illuminating laser beams to illuminate band gaps between said bands.

8. The apparatus as claimed in claim 7 which further comprises a raster clock coupled to a driving unit of a deflecting system to provide synchronism between a scanning movement and the movement of said recording surface, said information receiving means comprising a memory and decoder unit with an enable input coupled through a gating circuit to the output of the raster clock.

9. The apparatus as claimed in claim 8 which further comprises a full line duration determining unit having an output coupled to appropriate enable inputs of said control unit for blocking the generation of laser beans in moments of the scanning period other than the duration of full line scanning.

10. The apparatus as claimed in claim 9 which further comprises a useful line duration determining unit and an AND gate enabled by the output of said useful line duration determining unit, said AND gate being coupled between the output of the raster clock and the enable input of said memory and decoder unit to enable information recording during the scanning of the useful line duration only.

11. The apparatus as claimed in claim 8 wherein the oscillators for generating the laser beams for illuminating the band gaps are variable frequency oscillators, having respective frequency determining control inputs said control inputs are connected with outputs of sawtooth signal generators having operating frequencies being at least equal to the frequency of the raster clock pulses.

12. The apparatus as claimed in claim 9 wherein the control unit comprises an auxiliary oscillator with variable frequency to enable simultaneous changing the deflection of all outgoing laser beams, in their common plane, a sensing means for sensing the speed of movement of said recording surface, an error signal forming unit and a regulating unit, the output of said sensing means is coupled through said error signal forming unit (52) and regulating unit (53) to the frequency determining control input of said auxiliary oscillator for the exact positioning of said bands on the recording surface.

* * * * *